United States Patent
Niwa et al.

(10) Patent No.: US 10,127,939 B2
(45) Date of Patent: Nov. 13, 2018

(54) MAGNETIC STORAGE APPARATUS INCLUDING A MAGNETIC RECORDING MEDIUM HAVING A BARRIER LAYER BETWEEN TWO HEAT SINK LAYERS

(71) Applicant: SHOWA DENKO K.K., Tokyo (JP)

(72) Inventors: Kazuya Niwa, Chiba (JP); Lei Zhang, Chiba (JP); Yuji Murakami, Chiba (JP); Hisato Shibata, Chiba (JP); Takayuki Fukushima, Chiba (JP); Takehiro Yamaguchi, Chiba (JP); Tetsuya Kanbe, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/868,239

(22) Filed: Jan. 11, 2018

(65) Prior Publication Data

US 2018/0240487 A1 Aug. 23, 2018

(30) Foreign Application Priority Data

Feb. 21, 2017 (JP) .................. 2017-030003

(51) Int. Cl.
*G11B 5/68* (2006.01)
*G11B 5/65* (2006.01)
(Continued)

(52) U.S. Cl.
CPC .............. *G11B 5/65* (2013.01); *G11B 5/4866* (2013.01); *G11B 5/667* (2013.01); *G11B 5/706* (2013.01);
(Continued)

(58) Field of Classification Search
CPC ........ G11B 5/667; G11B 5/706; G11B 5/7325
(Continued)

(56) References Cited

U.S. PATENT DOCUMENTS

| | | | |
|---|---|---|---|
| 7,521,137 B2 | 4/2009 | Hohlfeld et al. | |
| 8,576,672 B1 * | 11/2013 | Peng ................. | G11B 5/7325 369/13.01 |

(Continued)

FOREIGN PATENT DOCUMENTS

| | | |
|---|---|---|
| JP | 2005-317178 | 11/2005 |
| JP | 2006-196151 | 7/2006 |

(Continued)

OTHER PUBLICATIONS

Werner Martienssen et al. (Eds.), "Springer Handbook of Condensed Matter and Materials Data", pp. 440, 460, 462, 464, 468, and 470, ISBN: 9783540443766, Springer (pub.), 2005.

(Continued)

*Primary Examiner* — Jefferson Evans
(74) *Attorney, Agent, or Firm* — IPUSA, PLLC

(57) ABSTRACT

A magnetic recording medium includes a substrate, a first heat sink layer, a barrier layer, a second heat sink layer, and a magnetic layer that are successively stacked. The magnetic layer is made of a material including a first main component that is an alloy having a $L1_0$ crystal structure and a content of 50 at % or higher, or content of 50 mol % or higher. The barrier layer is made of a material including a second main component that is one of an oxide, a nitride, and a carbide having a content of 50 at % or higher, or content of 50 mol % or higher.

17 Claims, 6 Drawing Sheets

(51) Int. Cl.
*G11B 5/48* (2006.01)
*G11B 5/706* (2006.01)
*G11B 5/667* (2006.01)
*G11B 5/73* (2006.01)
*G11B 5/00* (2006.01)

(52) U.S. Cl.
CPC .... *G11B 5/7325* (2013.01); *G11B 2005/0021* (2013.01)

(58) Field of Classification Search
USPC .......................................................... 360/135
See application file for complete search history.

(56) References Cited

U.S. PATENT DOCUMENTS

| | | | |
|---|---|---|---|
| 9,230,588 B2 | 1/2016 | Zhang et al. | |
| 9,251,834 B2* | 2/2016 | Zhang | G11B 5/65 |
| 9,406,329 B1* | 8/2016 | Ho | G11B 5/66 |
| 9,443,545 B2 | 9/2016 | Mosendz et al. | |
| 9,672,854 B2 | 6/2017 | Kubota et al. | |
| 9,754,618 B1* | 9/2017 | Srinivasan | G11B 5/66 |
| 9,824,710 B1* | 11/2017 | Yuan | G11B 5/7325 |
| 2004/0161638 A1* | 8/2004 | Maeda | G11B 5/65 428/832 |
| 2005/0213436 A1 | 9/2005 | Ono et al. | |
| 2007/0026263 A1 | 2/2007 | Kubota et al. | |
| 2011/0205862 A1* | 8/2011 | Kanbe | G11B 5/65 369/13.32 |
| 2012/0113768 A1* | 5/2012 | Kanbe | G11B 5/6088 369/13.24 |
| 2012/0307398 A1* | 12/2012 | Kanbe | G11B 5/65 360/75 |
| 2013/0314815 A1* | 11/2013 | Yuan | G11B 5/65 360/59 |
| 2014/0308542 A1 | 10/2014 | Zhang et al. | |
| 2014/0376127 A1* | 12/2014 | Kanbe | G11B 5/65 360/110 |
| 2015/0009786 A1* | 1/2015 | Kanbe | G11B 5/65 369/13.16 |
| 2015/0029830 A1* | 1/2015 | Zhang | G11B 5/7325 369/13.4 |
| 2015/0036242 A1* | 2/2015 | Zhang | G11B 5/65 360/135 |
| 2015/0117166 A1* | 4/2015 | Zhang | G11B 5/65 369/13.5 |
| 2018/0211688 A1* | 7/2018 | Fukushima | G11B 5/65 |
| 2018/0226092 A1* | 8/2018 | Fukushima | G11B 5/65 |

FOREIGN PATENT DOCUMENTS

| | | |
|---|---|---|
| JP | 2011-060344 | 3/2011 |
| JP | 2014-220029 | 11/2014 |
| JP | 2015-026411 | 2/2015 |
| JP | 2015-122137 | 7/2015 |
| JP | 2016-522957 | 8/2016 |

OTHER PUBLICATIONS

"Metal Data Book", pp. 12-13, Revised 4th Edition, series by the Japan Institute of Metals and Materials, Maruzen Co., Ltd. (pub.), 2004 with English Partial Translation.

* cited by examiner

| MATERIAL | THERMAL CONDUCTIVITY [W/m·K] | THICKNESS OF 1ST HEAT SINK LAYER [nm] |
|---|---|---|
| Ag | 425 | 10 |
| Au | 316 | 20 |
| Al | 238 | 20 |
| Cu | 397 | 15 |
| Rh | 148 | 25 |
| Mo | 137 | 25 |
| W | 174 | 25 |

FIG.5

| | 1ST HEAT SINK LAYER | | 1ST BARRIER LAYER | | | 2ND HEAT SINK LAYER | | 2ND BARRIER LAYER | | ΔSNR [dB] | ΔLDI/LDI [%] | CT-TG [K/nm] |
|---|---|---|---|---|---|---|---|---|---|---|---|---|
| | MATE-RIAL | THICK-NESS [nm] | MATERIAL | THICK-NESS [nm] | THERMAL CONDUCTIVITY [W/m·K] | MATE-RIAL | THICK-NESS [nm] | MATE-RIAL | THICK-NESS [nm] | | | |
| EI1-1 | W | 30 | MgO | 2.5 | 50-75 | W | 5 | MgO | 4 | ±0 | -4.5 | 3.4 |
| EI1-2 | W | 30 | MgO-46mol%TiO | 2.5 | - | W | 5 | MgO | 4 | ±0 | -4.2 | 3.5 |
| EI1-3 | W | 30 | TaN | 2.5 | 8.3 | W | 5 | MgO | 4 | ±0 | -3.5 | 3.5 |
| EI1-4 | W | 30 | ZrN | 2.5 | 20.9 | W | 5 | MgO | 4 | ±0 | -4.8 | 3.6 |
| EI1-5 | W | 30 | TiN | 2.5 | 29.1 | W | 5 | MgO | 4 | ±0 | -4.3 | 3.5 |
| EI1-6 | W | 30 | NbN | 2.5 | 3.6 | W | 5 | MgO | 4 | ±0 | -3.5 | 3.3 |
| EI1-7 | W | 30 | HfN | 2.5 | 21.6 | W | 5 | MgO | 4 | ±0 | -3.9 | 3.4 |
| EI1-8 | W | 30 | ZrC | 2.5 | 20.6 | W | 5 | MgO | 4 | ±0 | -5.2 | 3.6 |
| EI1-9 | W | 30 | TaC | 2.5 | 22.2 | W | 5 | MgO | 4 | ±0 | -3.5 | 3.4 |
| EI1-10 | W | 30 | TiC | 2.5 | 17-21 | W | 5 | MgO | 4 | ±0 | -5.2 | 3.6 |
| EI1-11 | W | 30 | NbC | 2.5 | 14.2 | W | 5 | MgO | 4 | ±0 | -3.8 | 3.3 |
| EI1-12 | W | 30 | MgO-38mol% TiO-10mol%TiN | 2.5 | - | W | 5 | MgO | 4 | ±0 | -5.4 | 3.6 |
| EI1-13 | W | 30 | MgO-38mol% TiO-10mol%TaN | 2.5 | - | W | 5 | MgO | 4 | ±0 | -5.4 | 3.6 |
| CE1-1 | W | 35 | - | - | - | - | - | MgO | 4 | ref1 | ref2 | 2.7 |
| CE1-2 | W | 30 | Cr | 2.5 | 91.3 | W | 5 | MgO | 4 | ±0 | 4.0 | 2.7 |
| CE1-3 | W | 30 | Ta | 2.5 | 57.6 | W | 5 | MgO | 4 | -0.5 | ±0 | 2.7 |
| CE1-4 | W | 30 | V | 2.5 | 31.6 | W | 5 | MgO | 4 | -0.9 | 0.5 | 2.5 |
| CE1-5 | W | 30 | Nb | 2.5 | 54.1 | W | 5 | MgO | 4 | ±0 | ±0 | 2.7 |
| CE1-6 | W | 30 | Hf | 2.5 | 22.9 | W | 5 | MgO | 4 | -1.5 | 0.5 | 2.5 |

FIG.6

| | 1ST HEAT SINK LAYER | | 1ST BARRIER LAYER | | 2ND HEAT SINK LAYER | | 2ND BARRIER LAYER | | SNR [dB] | LDI [mA] | MWW [nm] | CT-TG [K/nm] |
|---|---|---|---|---|---|---|---|---|---|---|---|---|
| | MATERIAL | THICKNESS [nm] | MATERIAL | THICKNESS [nm] | MATERIAL | THICKNESS [nm] | MATERIAL | THICKNESS [nm] | | | | |
| EI2-1 | W | 25 | ZrN | 2.5 | W-10at%Ta | 5 | MgO | 4 | 12.5 | 46.0 | 60.5 | 3.1 |
| EI2-2 | W | 30 | ZrN | 2.5 | W-10at%Ta | 5 | MgO | 4 | 12.7 | 47.5 | 66.0 | 3.4 |
| EI2-3 | W | 35 | ZrN | 2.5 | W-10at%Ta | 5 | MgO | 4 | 12.9 | 49.0 | 72.5 | 3.7 |
| EI2-4 | W | 40 | ZrN | 2.5 | W-10at%Ta | 5 | MgO | 4 | 13.2 | 50.5 | 78.3 | 3.9 |
| CE2-1 | W | 25 | — | — | W-10at%Ta | 5 | MgO | 4 | 12.5 | 49.0 | 61.6 | 2.3 |
| CE2-2 | W | 30 | — | — | W-10at%Ta | 5 | MgO | 4 | 12.7 | 50.5 | 66.4 | 2.6 |
| CE2-3 | W | 35 | — | — | W-10at%Ta | 5 | MgO | 4 | 12.9 | 52.0 | 72.1 | 2.9 |

FIG.7

| | 1ST HEAT SINK LAYER | | 1ST BARRIER LAYER | | 2ND HEAT SINK LAYER | | 2ND BARRIER LAYER | | ΔSNR [dB] | ΔLDI /LDI [%] |
|---|---|---|---|---|---|---|---|---|---|---|
| | MATERIAL | THICK-NESS [nm] | MATERIAL | THICK-NESS [nm] | MATERIAL | THICK-NESS [nm] | MATERIAL | THICK-NESS [nm] | | |
| EI3-1 | W-5mol%SiO$_2$ | 25 | NbC | 1 | W-5mol%SiO$_2$ | 5 | MgO | 5 | ±0 | -4.5 |
| EI3-2 | W-5mol%SiO$_2$ | 25 | NbC | 2.5 | W-5mol%SiO$_2$ | 5 | MgO | 5 | ±0 | -5.1 |
| EI3-3 | W-5mol%SiO$_2$ | 25 | NbC | 5 | W-5mol%SiO$_2$ | 5 | MgO | 5 | ±0 | -5.0 |
| EI3-4 | W-5mol%SiO$_2$ | 25 | NbC | 10 | W-5mol%SiO$_2$ | 5 | MgO | 5 | ±0 | -5.0 |
| EI3-5 | W-5mol%SiO$_2$ | 25 | NbC | 20 | W-5mol%SiO$_2$ | 5 | MgO | 5 | ±0 | -2.2 |
| CE3-1 | W-5mol%SiO$_2$ | 25 | — | — | W-5mol%SiO$_2$ | 5 | MgO | 5 | ref3 | ref4 |

MAGNETIC STORAGE APPARATUS INCLUDING A MAGNETIC RECORDING MEDIUM HAVING A BARRIER LAYER BETWEEN TWO HEAT SINK LAYERS

CROSS-REFERENCE TO RELATED APPLICATIONS

This application is based upon and claims priority to Japanese Patent Application No. 2017-030003 filed on Feb. 21, 2017, the entire contents of which are incorporated herein by reference.

BACKGROUND OF THE INVENTION

1. Field of the Invention

The present invention relates to a magnetic recording medium, and a magnetic storage apparatus including the magnetic recording medium.

2. Description of the Related Art

In order to further increase recording capacity (or storage capacity) of magnetic storage apparatuses such as HDDs (Hard Disk Drives), developments are made to increase recording density (or storage capacity) of magnetic recording media that are used in the HDDs. However, it is becoming more difficult to simultaneously reduce the size of magnetic grains forming a magnetic layer, improve thermal stability, and improve recording characteristics. This difficulty is also referred to as trilemma. On the other hand, active research and development in heat assisted magnetic recording methods show next-generation recording methods capable of overcoming the trilemma.

The heat assisted magnetic recording method uses a magnetic head having a laser light generator that generates laser light to irradiate near-field light on the magnetic recording medium. As a result, a surface of the magnetic recording medium is locally heated to assist recording, to record information on the magnetic recording medium in a state in which a coercivity of the magnetic recording medium is locally reduced. Because the heat assisted magnetic recording method heats the magnetic recording medium by the near-field light, measures are taken to control heating temperature and spreading of heat.

Examples of the measures taken to control heat include providing a heat sink layer made of high thermal conductivity material for the purposes of increasing thermal gradient and heat dissipation, providing a heat barrier layer under the magnetic layer for the purposes of effectively heating the magnetic layer, and providing a reflection control layer for the purposes of reducing reflection from the magnetic recording medium.

Various research, developments, and reports are made on the measures to control heat of the magnetic recording media used by the heat assisted magnetic recording method.

For example, U.S. Patent Publication No. US 2007/0026263 A1 proposes a magnetic recording medium having the heat sink layer including CuZr or AgPd, provided between a substrate and a magnetic recording layer.

In addition, Japanese Laid-Open Patent Publication No. 2006-196151 proposes a heat assisted magnetic recording medium having a temperature control layer formed by a thin film including regions of low thermal conductivity material at least partially through a thickness of the film, and regions of high thermal conductivity material separating the regions of low thermal conductivity material. The high thermal conductivity material is Cu, Au, Ag, or the like, for example. On the other hand, the low thermal conductivity material is $SiO_2$, $ZrO_2$, or the like, for example.

For example, Japanese Laid-Open Patent Publication No. 2016-522957 proposes a stack including a heat sink layer, and a MgO—Ti(ON) layer. The heat sink layer is arranged between the substrate and the magnetic recording layer. The Mg—Ti(ON) layer is arranged between the heat sink layer and the magnetic recording layer.

On the other hand, Japanese Laid-Open Patent Publication No. 2015-26411 proposes a magnetic recording medium including a barrier layer having a NaCl type crystal structure. The barrier layer is provided between a crystalline underlayer including Mo as a main component, and a magnetic layer. The crystalline underlayer includes one or more elements selected from Si and C in a range of 1 mol % to 20 mol %, or an oxide in a range of 1 vol % to 50 vol %.

Further, Japanese Laid-Open Patent Publication No. 2015-122137 proposes a magnetic recording medium including the magnetic recording layer above a plasmon underlayer that includes an Au alloy. The Au alloy includes one or more alloy constituent elements substantially not mixed to Au.

The magnetic recording medium may be designed to increase the thickness of the heat sink layer made of the high thermal conductivity material, that is, to increase a laser diode current LDI applied to a laser diode of the magnetic head. In this case, there are tendencies for the thermal gradient to become sharp and SNR (Signal-to-Noise Ratio) to become high.

However, when the laser diode current LDI is increased, load on elements forming the magnetic head increases, to more easily deteriorate the magnetic head. The HDD not only requires high recording density, but also high reliability. For this reason, magnetic heads that easily deteriorate are undesirable for the HDD.

Accordingly, in the HDD using the heat assisted magnetic recording method, reducing the laser diode current LDI is highly desired from viewpoints of reducing the load on the magnetic head and extending serviceable life of the magnetic head.

However, reducing (or improving) the laser diode current LDI and increasing (or improving) the SNR are in a tradeoff relationship. Consequently, simply reducing the laser diode current LDI decreases (or deteriorates) the SNR. In other words, it is conventionally difficult to reduce the laser diode current LDI without decreasing (or deteriorating) the SNR.

SUMMARY OF THE INVENTION

Embodiments of the present invention can provide a magnetic recording medium and a magnetic storage apparatus, capable of reducing the laser diode current LDI applied to the laser diode of the magnetic head without deteriorating the SNR.

According to one aspect of the present invention, a magnetic recording medium includes a substrate, a first heat sink layer provided on the substrate, a first barrier layer provided on the first heat sink layer, a second heat sink layer provided on the first barrier layer, and a magnetic layer provided on the second heat sink layer, wherein the magnetic layer is made of a material including a first main component that is an alloy having a $L1_0$ crystal structure and a content of 50 at % or higher, or content of 50 mol % or higher, and wherein the first barrier layer is made of a material including a second main component that is one of an oxide, a nitride, and a carbide having a content of 50 at % or higher, or content of 50 mol % or higher.

The second main component may have a NaCl type crystal structure, and may be selected from a group of materials consisting of MgO, TiO, NiO, TiN, TaN, NbN, HfN, ZrN, VN, CrN, TiC, TaC, NbC, HfC, and ZrC.

Each of the first heat sink layer and the second heat sink layer may be made of a material including a third main component that is selected from a group materials consisting of Ag, Au, Al, Cu, Rh, Mo, and W, and having a content of 50 at % or higher, or content of 50 mol % or higher.

According to another aspect of the present invention, a magnetic storage apparatus includes a magnetic recording medium, a magnetic head configured to write information to and read information from the magnetic recording medium, and a casing configured to accommodate the magnetic recording medium and the magnetic head, wherein the magnetic head includes a laser light generator configured to generate laser light, a waveguide configured to guide the laser light to a tip end of the magnetic head, and a near-field light generator configured to generate near-field light that heats the magnetic recording medium, wherein the magnetic recording medium includes a substrate, a first heat sink layer, a first barrier layer, a second heat sink layer, and a magnetic layer that are successively stacked, wherein the magnetic layer is made of a material including a first main component that is an alloy having a $L1_0$ crystal structure and a content of 50 at % or higher, or content of 50 mol % or higher, and wherein the first barrier layer is made of a material including a second main component that is one of an oxide, a nitride, and a carbide having a content of 50 at % or higher, or content of 50 mol % or higher.

Other objects and further features of the present invention will be apparent from the following detailed description when read in conjunction with the accompanying drawings.

BRIEF DESCRIPTION OF THE DRAWINGS

FIG. 5 is a table illustrating configuration and properties of magnetic recording media in a first embodiment and a first comparison example;

FIG. 6 is a table illustrating configuration and properties of magnetic recording media in a second embodiment and a second comparison example; and FIG. 7 is a table illustrating configuration and properties of magnetic recording media in a third embodiment and a third comparison example.

DESCRIPTION OF THE PREFERRED EMBODIMENTS

Figure 1:
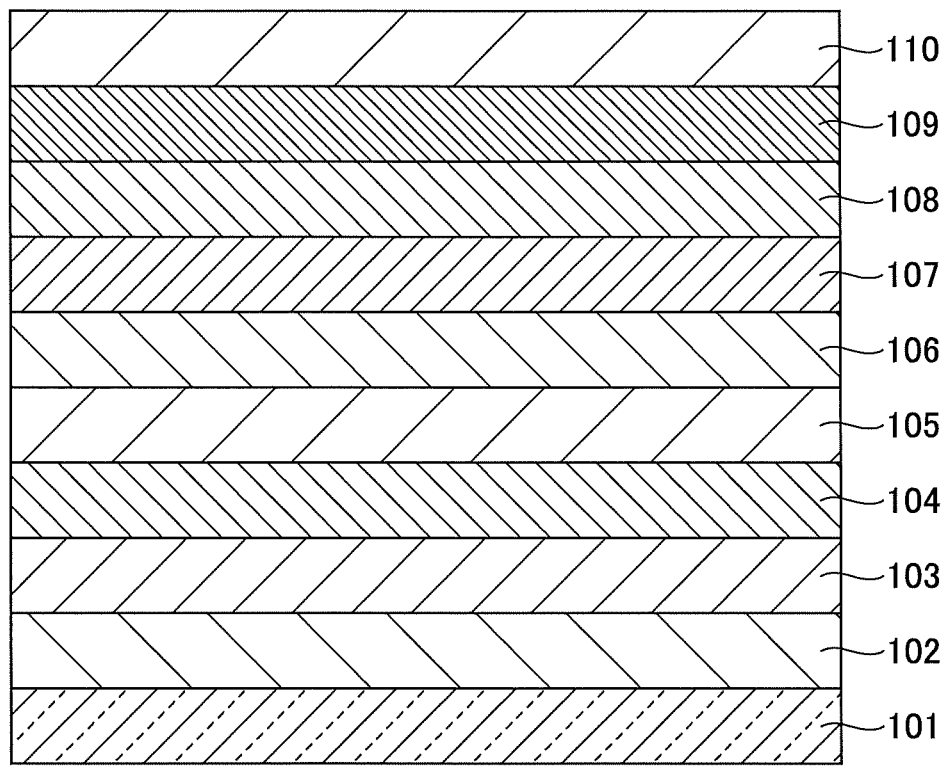
FIG. 1 is a cross sectional view illustrating an example of a magnetic recording medium in one embodiment of the present invention.

Embodiments and exemplary implementations of a magnetic recording medium and a magnetic storage apparatus according to the present invention will be described, by referring to the drawings. In each of the embodiments, the configuration, arrangement or position, material, and amount (at % or mol %) of element used in the magnetic recording medium or the magnetic storage apparatus may be appropriately modified, unless indicated otherwise.

[Magnetic Recording Medium]

FIG. 1 is a cross sectional view illustrating an example of a magnetic recording medium 401 in one embodiment of the present invention. In this example, the magnetic recording medium 401 is a heat assisted magnetic recording medium. The heat assisted magnetic recording medium is sometimes also referred to as a thermally assisted magnetic recording medium.

The magnetic recording medium 401 includes a substrate 101, an adhesion layer 102, an orientation control layer 103, a first heat sink layer 104, a first barrier layer 105, a second heat sink layer 106, a second barrier layer 107, a magnetic layer 108, a protection layer 109, and a lubricant layer 110 that are stacked in this order. The first barrier layer 105 is made of a material including a main component that is one of an oxide, a nitride, and a carbide. The magnetic layer 108 is made of a material including a main component that. is an alloy having a $L1_0$ crystal structure.

The constitution of "a main component" of a material will be described later in the specification.

The stacked configuration of the magnetic recording medium 401 enable reduction in a laser diode current LDI applied to a laser diode of a magnetic head, that is, reduce a laser diode power of the magnetic head, without deteriorating the SNR. As a result, it is possible to extend the serviceable life of the magnetic head, and provide the magnetic recording medium 401 having a high recording density.

The effect of reducing the laser diode current LDI applied to the laser diode of the magnetic head without deteriorating the SNR is obtained because the first barrier layer 105, made of the material including the main component that is one of the oxide, the nitride, and the carbide, is sandwiched between the first heat sink layer 104 and the second heat sink layer 106 respectively having thermal conductivities higher than a thermal conductivity of the first barrier layer 105. It may be regarded that the sandwiched configuration, in which the first barrier layer 105 is sandwiched between the first and second heat sink layers 104 and 106, enables efficient use of heat of laser light irradiated from the magnetic head. Preferably, the first barrier layer 105 that is thin, is sandwiched between the first and second heat sink layers 104 and 106 that are thick. As a result, it is possible to form an interface having a large thermal conductivity difference between the first barrier layer 105 and each of the first and second heat sink layers 104 and 106, without deteriorating the effects of the first and second heat sink layers 104 and 106. The interface causes a larger thermal gradient (or heat gradient) to be generated within the first and second heat sink layers 104 and 106. It may be regarded that the larger thermal gradient increases heat transfer in a direction perpendicular to a recording surface of the magnetic recording medium 401. For example, the recording surface of the magnetic recording medium 401 may be formed by an exposed surface (that is, an upper surface in FIG. 1) of the lubricant layer 110.

The material forming the first heat sink layer 104 may be the same as, or may be different from, a material forming the second heat sink layer 106. The materials that are the same may have the same composition with identical constituent-element-contents, or may have the same composition with mutually different constituent-element-contents. The "constituent-element-content" of the material refers to a content (or amount) of the constituent element within the material.

The first and second heat sink layers 104 and 106 are provided to diffuse the heat, accumulated in the magnetic layer 108, in the direction perpendicular to the recording surface of the magnetic recording medium 401, in order to reduce spreading of the heat in a direction parallel to the recording surface of the magnetic recording medium 401. In addition, the first and second heat sink layers 104 and 106 are provided to reduce spreading of the heat in the direction parallel to the recording surface of the magnetic recording medium 401, in order to reduce a transition width of heat and to quickly dissipate the heat accumulated in the magnetic layer 108 after recording. For this reason, the first and second heat sink layers 104 and 106, are preferably made of a high thermal conductivity material having a high thermal conductivity.

The first and second heat sink layers 104 and 106 are preferably made of a material including a main component that is selected from a group consisting of Ag, Au, Al, Cu, Rh, Mo, and W.

Next, a more detailed description will be given of the main component of each of the first and second heat sink layers 104 and 106.

First, the present inventors used W having a thermal conductivity of 174 W/m·K for the first and second heat sink layers 104 and 106, and designed the magnetic recording medium 401 capable of reducing the laser diode current LDI applied to the laser diode of the magnetic head without deteriorating the SNR. The SNR is measured by a known or conventional method of recording a signal on the magnetic recording medium 401 by the magnetic head, reproducing the recorded signal from the magnetic recording medium 401 by the magnetic head, and computing a ratio of a signal component of the reproduced signal to a noise component included in the reproduced signal.

More particularly, a stacked structure (design reference) is obtained by successively stacking the first heat sink layer 104 made of W and having a thickness of 25 nm, the first barrier layer 105 made of MgO and having a thickness of 2.5 nm, the second heat sink layer 106 made of W and having a thickness of 5 nm, the second barrier layer 107 made of MgO and having a thickness of 4 nm, and the magnetic layer 108 made of a material including a main component that is an alloy having a $L1_0$ crystal structure.

The thermal gradients of the first and second heat sink layers 104 and 106 are computed from the reference stacked structure of the magnetic recording medium 401. In addition, materials usable for the first and second heat sink layers 104 and 106 are studied from materials having a FCC (Face Centered Cubic) crystal structure or a BCC (Body Centered Cubic) crystal structure suited for controlling the orientation of the magnetic layer 108 made of the material including the main component that is the alloy having the $L1_0$ crystal structure, and thermal conductivities of such materials having the FCC or BCC crystal structure. As a result, Ag, Au, Al, Cu, Rh, and Mo are selected as the materials suitable for the first and second heat sink layers 104 and 106.

Figures 2, 3:
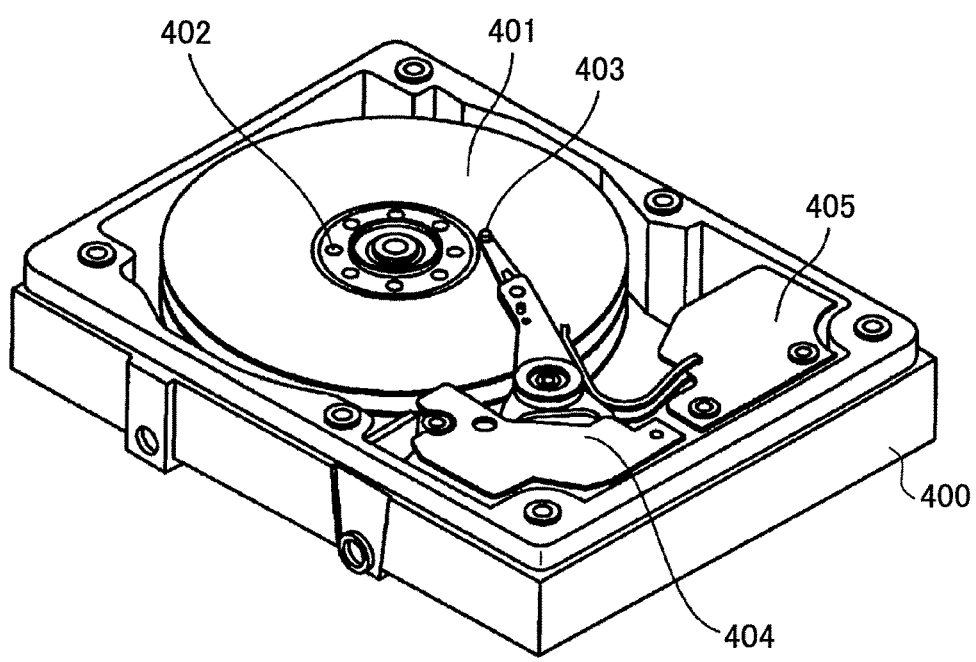
FIG. 2 is a table illustrating materials, thermal conductivities, and thicknesses of a first heat sink layer.
FIG. 3 is a perspective view illustrating an example of a magnetic storage apparatus in one embodiment of the present invention.

FIG. 2 is a table illustrating the materials, the thermal conductivities, and the thicknesses of the first heat sink layer 104. FIG. 2 illustrates the thermal conductivities of Ag, Au, Al, Cu, Rh, and Mo, and the thicknesses of the first heat sink layer 104 that is designed to approximate the thermal gradient of the magnetic recording medium 401 having the reference stacked structure.

The thermal conductivities of Ag, Au, Al, Cu, Rh, and Mo illustrated in FIG. 2 have values referenced from "Metal Data Book", pp. 12-13, Revised 4th Edition, series by The Japan Institute of Metals and Materials, Maruzen Co., Ltd. (pub.), 2004.

More preferably, the first and second heat sink layers 104 and 106 are made of a material including a main component that is (100)-face oriented crystalline Mo or W having the BCC crystal structure. In this case, it is possible to improve (100) orientation of the magnetic layer 108, because the first and second heat sink layers 104 and 106 can be famed without greatly deteriorating the orientation between the first and second barrier layers 105 and 107. In addition, although the magnetic recording medium 401 at the time of manufacture is heated to a high temperature, W and Mo are metals having a high melting point, and W and Mo are not greatly affected by heat.

In this specification and the claims, "a main component" of a material refers to a component having a content (or amount) of 50 at % or higher, or a content (or amount) of 50 mol % or higher, in the material. In other words, the amount of the main component present in the material is 50 at % or higher, or 50 mol % or higher. Preferably, the "main component" of the material refers to the component having a content (or amount) of 60 at % or higher, or a content (or amount) of 60 mol % or higher, in the material. In a case in which the material includes no constituent element having the content of 50 at % or higher, or the content of 50 mol % or higher, the main component may be one of the constituent elements of the material having a highest content (amount).

The first and second heat sink layers 104 and 106 may include at least one kind of oxide selected from a group consisting of $B_2O_3$, $GeO_2$, MgO, $SiO_2$, TiO, and $TiO_2$, within a content range that does not greatly reduce the thermal conductivity. In this case, it is possible to diffuse the heat, accumulated in the magnetic layer 108, in the direction perpendicular to the recording surface of the magnetic recording medium 401, and increase the effect of reducing the spreading of the heat in the direction parallel to the recording surface of the magnetic recording medium 401.

Next, the thicknesses of the first and second heat sink layers 104 and 106 will be described.

The first barrier layer 105 prevents diffusion of the heat supplied from the magnetic head. Hence, in order to efficiently utilize the effects of the first barrier layer 105 at the magnetic layer 108, the first barrier layer 105 is preferably arranged close to the magnetic layer 108. For this reason, the second heat sink layer 106 is preferably made thinner than the first heat sink layer 104.

The thickness of the second heat sink layer 106 is preferably 0.5 nm or greater and 25 nm or less, and more preferably 1 nm or greater and 10 nm or less.

The thermal conductivities of the first and second heat sink layers 104 and 106 are preferably high. For this reason, the main component of the material forming the first and second heat sink layers 104 and 106 has a thermal conductivity of 100 W/m·K or higher, and more preferably 120 W/m·K or higher. In this case, it is possible to increase the thermal conductivity in the direction perpendicular to the recording surface of the magnetic recording medium 401, at the first and second heat sink layers 104 and 106. As a result, the thermal gradient in the direction perpendicular to the recording surface of the magnetic recording medium 401 becomes sharp, and the SNR of the magnetic recording medium 401 increases (or improves).

The main component of the material forming the first barrier layer 105 preferably has a NaCl type crystal structure. Examples of oxides having the NaCl type crystal structure include MgO, TiO, NiO, or the like. Examples of nitrides having the NaCl type crystal structure include TiN, TaN, NbN, HfN, ZrN, VN, CrN, or the like. Examples of carbides having the NaCl type crystal structure include TiC, TaC, NbC, HfC, ZrC, or the like. Hence, the main component of the material forming the first barrier layer 105, having the NaCl type crystal structure, may be selected from a group consisting of MgO, TiO, NiO, TiN, TaN, NbN, HfN, ZrN, VN, CrN, TiC, TaC, NbC, HfC, and ZrC.

In the main component of the material forming the first barrier layer 105, a ratio of the number of one of oxygen atoms, nitrogen atoms, and carbon atoms to the number of metal atoms is preferably 1:1. Of course, one of the oxides, nitrides, and carbides not having the ratio 1:1 with respect to the number of metal atoms may coexist in the material forming the first barrier layer 105.

The thickness of the first barrier layer 105 is preferably 1 nm or greater and 10 nm or less, and more preferably 2.5 nm or greater and 10 nm or less. The effect of the first barrier layer 105 preventing the diffusion of heat increases when the thickness of the first barrier layer 105 is 1 nm or greater. On the other hand, the effect of the first and second heat sink layers 104 and 106 dissipating the heat increases when the thickness of the first barrier layer 105 is 10 nm or less.

The first barrier layer 105 may have a multi-layer structure that includes a plurality of stacked layers forming the first barrier layer 105. Materials forming the plurality of stacked layers of the first barrier layer 105 having the multi-layer structure may be appropriately selected by taking into consideration crystal structures, lattice mismatches (or lattice misfits), or the like of the materials.

In one embodiment, the first barrier layer 105 is sandwiched between the first and second heat sink layers 104, and in such a sandwiched configuration, it is preferable to take into consideration lattice matching of the layers in the sandwiched configuration. In other words, by forming the first barrier layer 105 by the material in which the main component has the NaCl type crystal structure, it is possible to maintain satisfactory orientation in the sandwiched configuration, and obtain satisfactory orientation of the magnetic layer 108.

The first barrier layer 105 may be formed by DC sputtering or RF sputtering, using a sputtering target that is made of a composition of the main component in the material forming the first barrier layer 105. In addition, the first barrier layer 105 may be formed by reactive sputtering that introduces oxygen, nitrogen, or hydrocarbon into a metal sputtering target. As long as the first barrier layer 105 finally has the desired composition and thickness, the effect of preventing diffusion of heat is obtainable regardless of the method used to form or deposit the first barrier layer 105.

The thermal conductivity of the first barrier layer 105 is required to be lower than the thermal conductivities of the first and second heat sink layers 104 and 106. For this reason, the thermal conductivity of the main component in the material forming the first barrier layer 105 is preferably 80 W/m·K or lower, and more preferably 30 W/m·K or lower.

In one embodiment, the first heat sink layer 104 and the first barrier layer 105 are in contact with each other, and the first barrier layer 105 and the second heat sink layer 106 are in contact with each other. According to this configuration, it is possible to further improve the effect of reducing the laser diode current LDI applied to the laser diode of the magnetic head and the effect of increasing (or improving) the SNR.

In one embodiment, the orientation control layer 103 is provided between the substrate 101 and the first heat sink layer 104. The orientation control layer 103 may be made of a Cr layer having the BCC crystal structure, or an alloy layer having the BCC crystal structure and including Cr as a main component thereof, or an alloy layer having a B2 crystal structure.

Examples of the alloy forming the alloy layer having the BCC crystal structure and including Cr as the main component thereof, include CrMn, CrMo, CrW, CrV, CrTi, CrRu, or the like. In this case, the crystal grain size, dispersion, or the like may be improved by adding B, Si, C, or the like to the alloy having the BCC crystal structure and including Cr as the main component thereof. On the other hand, examples of the alloy forming the alloy layer having a B2 crystal structure include RuAl, NiAl, or the like.

In one embodiment, the second barrier layer 107 is provided between the second heat sink layer 106 and the magnetic layer 108. A main component of the material forming the second barrier layer 107, having the NaCl type crystal structure, is preferably selected from a group consisting of MgO, TiO, NiO, TiN, TaN, NbN, HfN, and TiC.

The second barrier layer 107 functions as a thermal barrier so that it is possible to efficiently utilize the magnetic layer 108 without diffusing heat supplied from the magnetic head. The second barrier layer 107 is required to have a thermal conductivity lower than the thermal conductivity of the magnetic layer 108, in order to reduce the diffusion of heat by an interface formed between the second barrier layer 107 and the magnetic layer 108.

The second barrier layer 107 also has a function to control the orientation of the magnetic layer 108 having the $L1_0$ crystal structure. For this reason, the main component of the material forming the second barrier layer 107 preferably has the NaCl type crystal structure and a relatively small lattice mismatch (or misfit) with the lattice constant of the magnetic layer 108 having the $L1_0$ crystal structure. From this viewpoint, the main component of the material forming the second barrier layer 107 is more preferably MgO or TiN.

The main component of the alloy forming the magnetic layer 108 has the $L1_0$ crystal structure.

Generally, in order to achieve a high recording density, the magnetic layer is preferably formed by magnetic grains having a grain diameter on the order of several nm and isolated by a grain boundary segregation material. However, the magnetic recording medium becomes thermally unstable as a volume of the magnetic grains decreases. Hence, in one embodiment, the main component of the alloy forming the magnetic layer 108 has the $L1_0$ crystal structure and high magnetic anisotropy energy.

In the magnetic layer 108, the magnetic grains are preferably magnetically isolated. The grain boundary segregation material may be added to the alloy having the $L1_0$ crystal structure, such as FePt alloys, CoPt alloys, or the like, in order to control the magnetic grain size and the exchange coupling between the magnetic grains. Hence, the magnetic layer 108 becomes a granular structure which can reduce the exchange coupling between the magnetic grains and reduce the magnetic grain size. As a result, it is possible to further increase (or improve) the SNR of the magnetic recording medium 401.

Examples of the grain boundary segregation material include at least one kind of compound selected from a group consisting of $SiO_2$, $TiO_2$, $Cr_2O_3$, $Al_2O_3$, $B_2O_3$, $Ta_2O_5$, $ZrO_2$, $Y_2O_3$, $CeO_2$, $Fe_3O_4$, $GeO_2$, TiO, ZnO, BN, and C.

The protection layer 109 and the lubricant layer 110 are provided on the surface portion of the magnetic recording medium 401. Hydrogen, nitrogen, or the like may be added to a material forming the protection layer 109. The lubricant layer 110 may be formed by a liquid lubricant layer made of perfluoropolyether.

In one embodiment, a soft magnetic underlayer may be additionally provided in order to improve recording (or write) characteristics of the magnetic recording medium 401. The soft magnetic underlayer may be made of a noncrystalline (or amorphous) alloy, a microcrystalline alloy, a polycrystal alloy, or the like. The soft magnetic underlayer may have a stacked structure in which layers are antiferromagnetically coupled via an Ru layer.

The soft magnetic underlayer may be made of a material selected from a group consisting of CoFeB, CoFeZr, CoFeTa, CoFeTaZr, CoFeTaB, CoFeNi, CoNiTa, CoNiZr, CoZrB, CoTaZr, CoNbZr, FeAlSi, and FeTaC.

[Magnetic Storage Apparatus]

FIG. 3 is a perspective view illustrating an example of a magnetic storage apparatus in one embodiment of the present invention.

A magnetic storage apparatus illustrated in FIG. 3 includes a plurality of magnetic recording media 401, a driving mechanism 402 that drives the magnetic recording media 401 in a recording direction, a plurality of magnetic heads 403, a head moving mechanism 404 that moves the magnetic heads 403, and a signal processor 405 that are accommodated within a casing 400. In this example, the magnetic storage apparatus employs the heat assisted recording method. In addition, the plurality of magnetic recording media 401 are heat assisted magnetic disks.

Hence, the driving mechanism 402 rotates the plurality of magnetic recording media 401, that is, the heat assisted magnetic disks, in the recording direction. Each magnetic head 403 includes a recording (or write) part that records (or writes) signals to a corresponding one of the plurality of magnetic recording media 401, and a reproducing (or read) part that reproduces (or reads) signals from the corresponding one of the plurality of magnetic recording media 401. The head moving mechanism 404 moves the magnetic heads 403 relative to the plurality of magnetic recording media 401. The signal processor 405 processes signals that are input to the magnetic heads 403 to be recorded on the plurality of magnetic recording media 401, and processes signals that are reproduced from the plurality of magnetic recording media 401 by the magnetic heads 403 and output from the magnetic heads 403.

Figure 4:
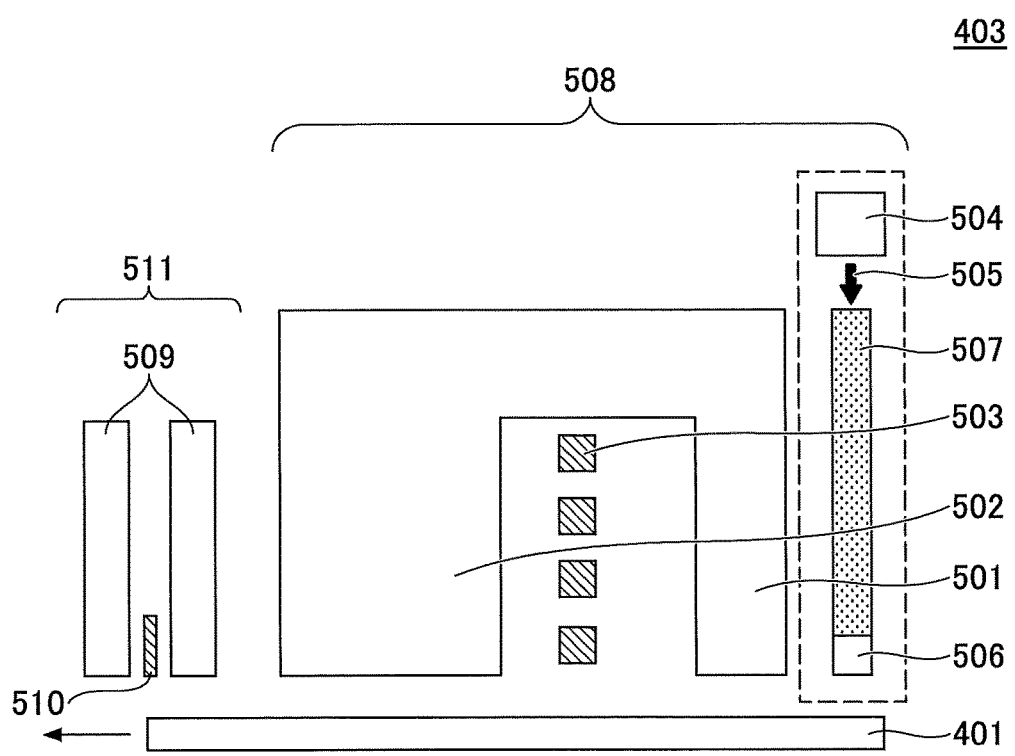
FIG. 4 is a cross sectional view schematically illustrating a structure of a magnetic head illustrated in FIG. 3.

FIG. 4 is a cross sectional view schematically illustrating a structure of the magnetic head illustrated in FIG. 3. As illustrated in FIG. 4, the magnetic head 403 includes a recording head 508 and a reproducing head 511.

The recording head 508 includes a main magnetic pole 501, an auxiliary magnetic pole 502, a coil 503 that generates a magnetic field, a laser diode 504 that generates laser light 505, a near-field light generator (or near-field light generating element) 506 that generates near-field light for heating the magnetic recording medium 401, and a waveguide 507. The waveguide 507 guides the laser light 505 generated from the laser diode 504 to the near-field light generator 506 that is provided at a tip end of the magnetic head 403.

The reproducing head 511 includes a reproducing element 511, such as a TMR (Tunneling Magneto-Resistive) element or the like, that is sandwiched between a pair of shields 509.

The magnetic storage apparatus illustrated in FIG. 3 includes the magnetic recording media 401 that enable the laser diode current LDI and the SNR to be satisfactorily balanced. For this reason, it is possible to extend the serviceable life of the magnetic heads 403, and provide the magnetic storage apparatus having the magnetic recording media 401 with a high recording density.

[Exemplary Implementations]

Next, exemplary implementations according to the present invention, together with comparison examples, will be described. However, the present invention is not limited to these exemplary implementations, and various variations, modifications, and substitutions may be made without departing from the scope of the present invention.

First Embodiment (Exemplary Implementation EI1-1)

In a first embodiment, the heat assisted magnetic recording medium 401 illustrated in FIG. 1 in accordance with an exemplary implementation EI1-1 was manufactured by the following method.

First, an adhesion layer 102 made of Cr-50 at % Ti (Cr-content of 50 at % and Ti-content of 50 at %) and having a thickness of 50 nm is deposited on a glass substrate 101 having an outer diameter of 2.5 inches, and thereafter heated to 320° C. Next, an orientation control layer 103 made of Cr and having a thickness of 20 nm, a first heat sink layer 104 made of W and having a thickness of 30 nm, a first barrier layer 105 made of MgO having the NaCl type crystal structure and a thickness of 2.5 nm, and a second heat sink layer 106 made of W and having a thickness of 5 nm are successively deposited on the adhesion layer 102. Further, a second barrier layer 107 made of MgO and having a thickness of 4 nm is deposited on the second heat sink layer 106, and thereafter heated to 620° C. Next, a magnetic layer 108 made of (Fe-50 at % Pt)-10 mol % SiO2-8 mol % BN (alloy-content of 82 mol % of alloy including Fe-content of 50 at % and Pt-content of 50 at %, $SiO_2$-content of 10 mol %, and BN-content of 8 mol %) and having a thickness of 8 nm is deposited on the second barrier layer 107. In addition, a protection layer 109 made of DLC (Diamond-Like Carbon) and having a thickness of 4.0 nm is deposited on the magnetic layer 108. A liquid lubricant layer 110 made of perfluoropolyether and having a thickness of 1.5 nm is coated on the protection layer 109.

An XRD (X-Ray Diffraction) spectrum of the heat assisted magnetic recording medium 401 in accordance with the exemplary implementation EI1, manufactured by the above described processes, was measured. A mixture of peaks of $L1_0$-FePt(001) and $L1_0$-FePt(002), with FCC-FePt (200) was confirmed. In addition, it was confirmed that the Cr orientation control layer 103 displays a (100) orientation, and that a combined peak of the first and second heat sink layers 104 and 106 also displays a (100) orientation.

(Exemplary Implementations EI1-2 to EI1-13)

In the first embodiment, the heat assisted magnetic recording media 401 illustrated in FIG. 1 in accordance with exemplary implementations EI1-2 to EI1-13 were manufactured by the method described above used to manufacture the heat assisted magnetic recording medium 401 in accordance with the exemplary implementation EI1-1, except that materials illustrated in FIG. 5 were used for the first barrier layer 105 of the exemplary implementations EI1-2 to EI1-13. FIG. 5 is a table illustrating configuration and properties of magnetic recording media in the first embodiment and a first comparison example. The first comparison example includes comparison examples CE1-1 to CE1-6 illustrated in FIG. 5. Hence, FIG. 5 illustrates the material and the thickness of each of the first and second sink layers 104 and 106, and the first and second barrier layers 105 and 107, the thermal conductivity of the first barrier layer 105, a ΔSNR value, a ΔLDI/LDI value, and a CT-TG value of each of the exemplary implementations EI1-1 to EI1-13 and the comparison examples CE1-1 to CE1-6. The ΔSNR value, the ΔLDI/LDI value, and the CT-TG value will be described later.

The materials forming the first barrier layer 105 of the exemplary implementations EI1-1 to EI1-13 and the comparison examples CE1-1 to CE1-6 are as follows.

Exemplary Implementation EI1-1: MgO
Exemplary Implementation EI1-2: MgO-46 mol % TiO (MgO-content of 54 mol % and a TiO-content of 46 mol %)
Exemplary Implementation EI1-3: TaN
Exemplary Implementation EI1-4': ZrN
Exemplary Implementation EI1-5: TiN
Exemplary Implementation EI1-6: NbN
Exemplary Implementation EI1-7: HfN
Exemplary Implementation EI1-8: ZrC
Exemplary Implementation EI1-9: TaC
Exemplary Implementation EI1-10: TiC
Exemplary Implementation EI1-11: NbC
Exemplary Implementation EI1-12: MgO-38 mol % TiO-10 mol % TiN (MgO-content of 52 mol %, TiO-content of 38 mol %, and TiN-content of 10 mol %)
Exemplary Implementation EI1-13: MgO-38 mol % TiO-10 mol % TaN (MgO-content of 52 mol %, TiO-content of 38 mol %, and TaN-content of 10 mol %)

Hence, the material forming the first barrier layer 105 is an oxide in the exemplary implementations EI1-1, EI1-2, EI1-12, and EI1-13, a nitride in the exemplary implementations EI1-3 to EI1-7, EI1-12, and EI1-13, and a carbide in the exemplary implementations EI1-8 to EI1-11, and each of these materials has the NaCl type crystal structure. For this reason, the first barrier layer 105 can be epitaxially grown on the first heat sink layer 104 made of W having the BCC crystal structure. In addition, the second heat sink layer 106 made of W can be epitaxially grown on the first barrier layer 105.

(Comparison Examples CE1-1 to CE1-6)

In the first comparison example, the heat assisted magnetic recording media 401 in accordance with the comparison examples CE1-1 to CE1-6 were manufactured by the method described above used to manufacture the heat assisted magnetic recording medium 401 in accordance with the exemplary implementation EI1-1, except that materials illustrated in FIG. 5 were used for the first barrier layer 105 of the comparison examples CE1-1 to CE1-6.

No first barrier layer 105 is provided in the comparison example CE1-1. The first barrier layer 105 is made of a metal material illustrated in FIG. 5 in each of the comparison examples CE1-2 to CE1-6.

As illustrated in FIG. 5, a sum of the thicknesses of the first and second heat sink layers 104 and 106 is 35 nm in the heat assisted magnetic recording media 401 in accordance with each of the exemplary implementations EI1-1 to EI1-13 and the comparison examples CE1-1 to CE1-6, so that the effects of the first and second heat sink layers 104 and 106 become approximately the same.

Next, the SNR, the laser diode current LDI, and the CT-TG (Cross-Track Thermal-Gradient) were evaluated for each of the heat assisted magnetic recording media 401 in accordance with the exemplary implementations EI1-1 to EI1-13 and the comparison examples CE1-1 to CE1-6. The CT-TG is the thermal gradient in a cross-track direction on each heat assisted magnetic recording medium 401.

The SNR, that is an electromagnetic conversion characteristic, was measured by a spin stand tester using a magnetic head having a laser spot heating mechanism. The laser diode current LDI applied to the laser diode of the magnetic head is adjusted, so that a recording track width (or MWW: Magnetic Write Width), defined as a half-value width of the reproduced signal waveform, becomes 70 nm.

In addition, the same spin stand tester to compute the CT-TG when a Curie temperature Tc is 700 K.

The SNR is evaluated using the SNR of the heat assisted magnetic recording medium 401 in accordance with the comparison example CE1-1 having no first barrier layer 105, as a SNR reference value ref1. The ΔSNR value of each of exemplary implementations EI1-1 to EI1-13 and the comparison examples CE1-2 to CE1-6 is a difference of the SNR of each of the exemplary implementations EI1-1 to EI1-13 and the comparison examples CE1-2 to CE1-6 from the SNR reference value ref1 of the comparison example CE1-1.

The laser diode current LDI is evaluated using the laser diode current LDI applied to the laser diode 504 of the magnetic head 403 for the comparison example CE1-1 having no first barrier layer 105, as a LDI reference value ref2. The LLDI/LDI value for each of the exemplary implementations EI1-1 to EI1-13 and the comparison examples CE1-2 to CE1-6 is a ratio a difference of the laser diode current LDI for each of exemplary implementations EI1-1 to EI1-13 and the comparison examples CE1-2 to CE1-6 from the LDI reference value ref2 for the comparison example CE1-1, with respect to the LDI reference value ref2 for the comparison example CE1-1.

The thermal conductivities of the materials forming the first barrier layer 105 have values illustrated in FIG. 5. The thermal conductivities of the oxides, the nitrides, and the carbides illustrated in FIG. 5 and forming the first barrier layer 105 have values referenced from Werner Martienssen et al. (Eds.), "Springer Handbook of Condensed Matter and Materials Data", pp. 440, 460, 462, 464, 468, and 470, ISBN: 9783540443766, Springer (pub.), 2005. On the other hand, the thermal conductivities of the metals illustrated in FIG. 5 and forming the first barrier layer 105 have values referenced from "Metal Data Book", pp. 12-13, Revised 4th Edition, series by The Japan Institute of Metals and Materials, Maruzen Co., Ltd. (pub.), 2004.

In the case of the exemplary implementations EI1-1 to EI1-13 in which the first barrier layer 105 is made of the oxide, the nitride, or the carbide, the ΔSNR values of the heat assisted magnetic recording media 401 were within error ranges. The SNR values for the exemplary implementations EI1-1 to EI1-13 were substantially the same as the SNR reference value ref1 of the comparison example CE1-1 in which no first barrier layer 105 is provided.

In contrast, in the case of the exemplary implementations EI1-1 to EI1-13, the laser diode current LDI decreased by approximately 3.5% to 5.4% with respect to the reference LDI ref2 for the comparison example CE1-1 in which no first barrier layer 105 is provided.

Accordingly, it was confirmed that, in the case of the exemplary implementations EI1-1 to EI1-13 having the first barrier layer 105 made of the oxide, the nitride, or the carbide, the laser diode current LDI can be reduced without deteriorating (or decreasing) the SNR.

Among the exemplary implementations EI1-1 to EI1-13, it was confirmed that the reduction in the laser diode current LDI is slightly larger when the first barrier layer 105 is made of the nitride or carbide of Zr or Ti, or includes MgO, as compared to when the first barrier layer 105 is made of the nitride or carbide of Ta, Nb, or Hf.

In contrast, it was confirmed that no reduction occurs in the laser diode current LDI for the comparison examples CE1-1 to CE1-6 in which the first barrier layer 105 is made of a metal material. In addition, no improvement of the SNR was confirmed for these comparison examples CE1-1 to CE1-6. Accordingly, it was confirmed from these results that there is no improvement in the balance between the SNR and the laser diode current LDI when the metal material is used for the first barrier layer 105, but rather, that the balance between the SNR and the laser diode current LDI deteriorates.

It was also confirmed from FIG. 5 that the CT-TG of the heat assisted magnetic recording media 401 in accordance with the exemplary implementations EI1-1 to EI1-13 increases by approximately 30% when compared to the CT-TG of the heat assisted magnetic recording media 401 in accordance with the comparison examples CE1-1 to CE1-6. In other words, it was confirmed that the thermal gradient improves for the heat assisted magnetic recording media 401 in accordance with the exemplary implementations EI1-1 to EI1-13 improves when compared to the thermal gradient of the heat assisted magnetic recording media 401 in accordance with the comparison examples CE1-1 to CE1-6.

The thermal conductivities of the materials forming the first barrier layer 105 of the heat assisted magnetic recording media 401 in accordance with the exemplary implementations EI1-1 to EI1-13 differ depending on the materials. However, the thermal conductivity of each of the materials forming the first barrier layer 105 of the heat assisted magnetic recording media 401 in accordance with the exemplary implementations EI1-1 to EI1-13 is considerably lower than the thermal conductivity of 174 W/m·K of W forming the first and second heat sink layers 104 and 106.

Second Embodiment (Exemplary Implementation EI2-1)

In a second embodiment, the heat assisted magnetic recording medium 401 illustrated in FIG. 1 in accordance with an exemplary implementation EI2-1 was manufactured by the following method.

First, an adhesion layer 102 made of Cr-50 at % Ti and having a thickness of 50 nm is deposited on a glass substrate 101 having an outer diameter of 2.5 inches, and thereafter heated to 320° C. Next, an orientation control layer 103 made of Cr and having a thickness of 20 nm, a first heat sink layer 104 made of W and having a thickness of 25 nm, a first barrier layer 105 made of ZrN having a thickness of 2.5 nm, and a second heat sink layer 106 made of W-10 at % Ta and having a thickness of 5 nm are successively deposited on the adhesion layer 102. Further, a second barrier layer 107 made of MgO having the NaCl crystal structure and a thickness of 4 nm is deposited on the second heat sink layer 106, and thereafter heated to 650° C. Next, a first magnetic layer made of (Fe-50 at % Pt)-35 mol % C and having a thickness of 4 nm is deposited on the second barrier layer 107, and a second magnetic layer made of (Fe-50 at % Pt)-12 mol % $SiO_2$ and a thickness of 4 nm is deposited on the first magnetic layer. The first and second magnetic layers are successively stacked to form a magnetic layer 108. In addition, a protection layer 109 made of DLC and having a thickness of 4 nm is deposited on the magnetic layer 108. A liquid lubricant layer 110 made of perfluoropolyether and having a thickness of 1.5 nm is coated on the protection layer 109.

(Exemplary Implementations EI2-2 to EI2-4)

In the second embodiment, the heat assisted magnetic recording media 401 illustrated in FIG. 1 in accordance with exemplary implementations EI2-2, EI2-3, and EI2-4 were manufactured by the method described above used to manufacture the heat assisted magnetic recording medium 401 in accordance with the exemplary implementation EI2-1, except that the thickness of the first heat sink layer 104 is 30 nm, 35 nm, and 40 nm, respectively, as illustrated in FIG. 6.

FIG. 6 is a table illustrating configuration and properties of magnetic recording media in the second embodiment and a second comparison example. The second comparison example includes comparison examples CE2-1 to CE2-3 illustrated in FIG. 6. Hence, FIG. 6 illustrates the material and the thickness of each of the first and second sink layers 104 and 106, and the first and second barrier layers 105 and 107, the SNR value, the laser diode current LDI, the MWW value, and the CT-TG value of each of the exemplary implementations EI2-1 to EI2-4 and the comparison examples CE2-1 to CE2-3. The MWW value is defined as the half-value width of the reproduced signal waveform, used when confirming the SNR and the laser diode current DLI.

(Comparison Examples CE2-1 to CE2-3)

In the second comparison example, the heat assisted magnetic recording media 401 in accordance with the comparison examples CE2-1 to CE2-3 were manufactured by the method described above used to manufacture the heat assisted magnetic recording media 401 in accordance with the exemplary implementations EI2-1 to EI2-3, except that no first barrier layer 105 is provided in the comparison examples CE2-1 to CE2-3.

The heat assisted magnetic recording media 401 in accordance with the exemplary implementations EI2-1 to EI2-3 in which the material forming the first barrier layer 105 is a nitride, and the heat assisted magnetic recording media 401 in accordance with the comparison examples CE2-1 to CE2-3 having no first barrier layer 105, were compared for cases in which the thicknesses of the first heat sink layer 104 are the same, respectively. From results of this comparison, it was confirmed that the SNRs are substantially the same for the exemplary implementations EI2-1 to EI2-3 and the comparison examples CE2-1 to CE2-3, respectively. On the other hand, under the condition in which the thicknesses of the first heat sink layer 104 are the same, it was confirmed that the laser diode currents LDI for the exemplary implementations EI2-1 to EI2-3 are reduced by approximately 3 mA with respect to the laser diode currents LDI for the comparison examples CE2-1 to CE2-3, respectively. Accordingly, from these results, it was confirmed that the exemplary implementations EI2-1 to EI2-3 and also EI2-4 can reduce the laser diode current LDI without deteriorating the SNR, when compared to the comparison examples CE2-1 to CE2-3.

Third Embodiment (Exemplary Implementation EI3-1]

In a third embodiment, the heat assisted magnetic recording medium 401 illustrated in FIG. 1 in accordance with an exemplary implementation EI3-1 was manufactured by the following method.

First, an adhesion layer 102 made of Cr-50 at % Ti and having a thickness of 50 nm is deposited on a glass substrate 101 having an outer diameter of 2.5 inches, and thereafter heated to 300° C. Next, an orientation control layer 103 made of Cr-10 at % Ti and having a thickness of 30 nm, a first heat sink layer 104 made of W-5 mol % $SiO_2$ (W-content of 95 mol % and $SiO_2$-content of 5 mol %) and having a thickness of 25 nm, a first barrier layer 105 made of NbC having a thickness of 1 nm, and a second heat sink layer 106 made of W-5 mol % $SiO_2$ and having a thickness of 5 nm are successively deposited on the adhesion layer 102. Further, a second barrier layer 107 made of MgO having the NaCl crystal structure and a thickness of 5 nm is deposited on the second heat sink layer 106, and thereafter heated to 600° C. Next, a magnetic layer 108 made of (Fe-46 at % Pt)-15 mol % $SiO_2$ and having a thickness of 8 nm is deposited on the second barrier layer 107. In addition, a protection layer 109 made of DLC and having a thickness of 4 nm is deposited on the magnetic layer 108. A liquid lubricant layer 110 made of perfluoropolyether and having a thickness of 1.5 nm is coated on the protection layer 109.

(Exemplary Implementations EI3-2 to E13-5)

In the third embodiment, the heat assisted magnetic recording media 401 illustrated in FIG. 1 in accordance with exemplary implementations EI3-2, EI3-3, EI3-4, and EI3-5 were manufactured by the method described above used to manufacture the heat assisted magnetic recording medium 401 in accordance with the exemplary implementation EI3-1, except that the thickness of the first barrier layer 105 is 2.5 nm, 5 nm, 10 nm, and 20 nm, respectively, as illustrated in FIG. 7. FIG. 7 is a table illustrating configuration and properties of magnetic recording media in the third embodiment and a third comparison example. The third comparison example includes a comparison example CE3-1 illustrated in FIG. 7. Hence, FIG. 7 illustrates the material and the thickness of each of the first and second sink layers 104 and 106, and the first and second barrier layers 105 and 107, the ΔSNR value, and the ΔLDI/LDI of each of the exemplary implementations EI3-1 to E13-5 and the comparison example CE3-1. The recording track width (or MWW), defined as the half-value width of the reproduced signal waveform, was 70 nm when confirming the SNR and the laser diode current LDI.

(Comparison Example CE3-1)

In the third comparison example, the heat assisted magnetic recording medium 401 in accordance with the comparison example CE3-1 was manufactured by the method described above used to manufacture the heat assisted magnetic recording media 401 in accordance with the exemplary implementations EI3-1 to EI3-5, except that no first barrier layer 105 is provided in the comparison example CE3-1.

As illustrated in FIG. 7, a sum of the thicknesses of the first and second heat sink layers 104 and 106 is 30 nm in the heat assisted magnetic recording media 401 in accordance with each of the exemplary implementations EI3-1 to EI3-5 and the comparison example CE3-1, so that the effects of the first and second heat sink layers 104 and 106 become approximately the same.

The SNR is evaluated using the SNR of the heat assisted magnetic recording medium 401 in accordance with the comparison example CE3-1 having no first barrier layer 105, as a SNR reference value ref3. The ΔSNR value of each of exemplary implementations EI3-1 to EI3-5 is a difference of the SNR of each of the exemplary implementations EI3-1 to EI3-5 from the SNR reference value ref3 of the comparison example CE3-1.

The laser diode current LDI is evaluated using the laser diode current LDI applied to the laser diode 504 of the magnetic head 403 for the comparison example CE3-1 having no first barrier layer 105, as a LDI reference value ref4. The ΔLDI/LDI value for each of the exemplary implementations EI3-1 to EI3-5 is a ratio of a difference of the laser diode current LDI for each of exemplary implementations EI3-1 to EI3-5 from the LDI reference value ref4 for the comparison example CE3-1, with respect to the LDI reference value ref4 for the comparison example CE3-1.

In the case of the exemplary implementations EI3-1 to EI3-5 in which the first barrier layer 105 is made of the carbide, the tSNR values of the heat assisted magnetic recording media 401 were within error ranges. The SNR values for the exemplary implementations EI3-1 to EI3-5 were substantially the same as the SNR reference value ref3 of the comparison example CE3-1 in which no first barrier layer 105 is provided.

In contrast, in the case of the exemplary implementations EI3-1 to EI3-5, the laser diode current LDI decreased by approximately 2.2% to 5.1% with respect to the reference LDI ref4 for the comparison example CE3-1 in which no first barrier layer 105 is provided.

Accordingly, it was confirmed that, in the case of the exemplary implementations EI3-1 to EI3-5 having the first barrier layer 105 made of the carbide, the laser diode current LDI can be reduced without deteriorating (or decreasing) the SNR.

Embodiments and exemplary implementations of the present invention can provide a magnetic recording medium and a magnetic storage apparatus, capable of reducing the laser diode current LDI applied to the laser diode of the magnetic head without deteriorating the SNR.

Although the embodiments and the exemplary implementations are numbered with, for example, "first," "second," "third," etc., the ordinal numbers do not imply priorities of the embodiments and the exemplary implementations.

Further, the present invention is not limited to these embodiments and exemplary implementations, but various variations and modifications may be made without departing from the scope of the present invention.

What is claimed is:

1. A magnetic recording medium comprising:
   a substrate;
   a first heat sink layer provided on the substrate;
   a first barrier layer provided on the first heat sink layer;
   a second heat sink layer provided on the first barrier layer; and
   a magnetic layer provided on the second heat sink layer,
   wherein the magnetic layer is made of a material including a first main component that is an alloy having a $L1_0$ crystal structure and a content of 50 at % or higher, or content of 50 mol % or higher, and
   wherein the first barrier layer is made of a material including a second main component that is one of an oxide, a nitride, and a carbide having a content of 50 at % or higher, or content of 50 mol % or higher.

2. The magnetic recording medium as claimed in claim 1, wherein the second main component has a NaCl type crystal structure.

3. The magnetic recording medium as claimed in claim 2, wherein the second main component having the NaCl type crystal structure is selected from a group consisting of MgO, TiO, NiO, TiN, TaN, NbN, HfN, ZrN, VN, CrN, TiC, TaC, NbC, HfC, and ZrC.

4. The magnetic recording medium as claimed in claim 1, wherein the first barrier layer has a thickness in a range of 1 nm to 10 nm.

5. The magnetic recording medium as claimed in claim 1, wherein the second main component has a thermal conductivity of 80 W/m·K or lower.

6. The magnetic recording medium as claimed in claim 1, wherein the second heat sink layer has a thickness less than a thickness of the first heat sink layer.

7. The magnetic recording medium as claimed in claim 1, wherein each of the first heat sink layer and the second heat sink layer is made of a material including a third main component that is selected from a group consisting of Ag, Au, Al, Cu, Rh, Mo, and W, and having a content of 50 at % or higher, or content of 50 mol % or higher.

8. The magnetic recording medium as claimed in claim 1, wherein each of the first heat sink layer and the second heat sink layer is made of a material including a third main component that has a thermal conductivity of 100 W/m·K or higher.

9. The magnetic recording medium as claimed in claim 1, further comprising:
   a second barrier layer provided between the second heat sink layer and the magnetic layer,
   wherein the second barrier layer is made of a material including a main component having a NaCl type crystal structure and selected from a group consisting of MgO, TiO, NiO, TiN, TaN, NbN, HfN, and TiC, and having a content of 50 at % or higher, or content of 50 mol % or higher.

10. A magnetic storage apparatus comprising:
    a magnetic recording medium;
    a magnetic head configured to write information to and read information from the magnetic recording medium; and
    a casing configured to accommodate the magnetic recording medium and the magnetic head,
    wherein the magnetic head includes a laser light generator configured to generate laser light, a waveguide configured to guide the laser light to a tip end of the magnetic head, and a near-field light generator configured to generate near-field light that heats the magnetic recording medium,
    wherein the magnetic recording medium includes a substrate, a first heat sink layer, a first barrier layer, a second heat sink layer, and a magnetic layer that are successively stacked,
    wherein the magnetic layer is made of a material including a first main component that is an alloy having a $L1_0$ crystal structure and a content of 50 at % or higher, or content of 50 mol % or higher, and
    wherein the first barrier layer is made of a material including a second main component that is one of an oxide, a nitride, and a carbide having a content of 50 at % or higher, or content of 50 mol % or higher.

11. The magnetic storage apparatus as claimed in claim 10, wherein the second main component of the first barrier layer of the magnetic recording medium has a NaCl type crystal structure and is selected from a group consisting of MgO, TiO, NiO, TiN, TaN, NbN, HfN, ZrN, VN, CrN, TiC, TaC, NbC, HfC, and ZrC.

12. The magnetic storage apparatus as claimed in claim 10, wherein the first barrier layer of the magnetic recording medium has a thickness in a range of 1 nm to 10 nm.

13. The magnetic storage apparatus as claimed in claim 10, wherein the second main component of the first barrier layer of the magnetic recording medium has a thermal conductivity of 80 W/m·K or lower.

14. The magnetic storage apparatus as claimed in claim 10, wherein the second heat sink layer of the magnetic recording medium has a thickness less than a thickness of the first heat sink layer.

15. The magnetic storage apparatus as claimed in claim 10, wherein each of the first heat sink layer and the second heat sink layer of the magnetic recording medium is made of a material including a third main component that is selected from a group consisting of Ag, Au, Al, Cu, Rh, Mo, and W, and having a content of 50 at % or higher, or content of 50 mol % or higher.

16. The magnetic storage apparatus as claimed in claim 10, wherein each of the first heat sink layer and the second heat sink layer of the magnetic recording medium is made of a material including a third main component that has a thermal conductivity of 100 W/m·K or higher.

17. The magnetic storage apparatus as claimed in claim 10, wherein the magnetic recording medium further includes:
    a second barrier layer provided between the second heat sink layer and the magnetic layer,
    wherein the second barrier layer is made of a material including a main component having a NaCl type crystal structure and selected from a group consisting of MgO, TiO, NiO, TiN, TaN, NbN, HfN, and TiC, and having a content of 50 at % or higher, or content of 50 mol % or higher.

* * * * *